(12) United States Patent
Brady et al.

(10) Patent No.: US 6,188,795 B1
(45) Date of Patent: *Feb. 13, 2001

(54) DATA COMPRESSION

(75) Inventors: Noel Brady; Liam Ward; Tommy Curran, all of Dublin; Noel Murphy, Enfield, all of (IE)

(73) Assignee: Dublin City University, Dublin (IE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/873,567

(22) Filed: Jun. 12, 1997

(30) Foreign Application Priority Data

Jun. 13, 1996  (IE) ................................... S960440

(51) Int. Cl.[7] .............................. G06K 9/36; H04N 1/41; H03M 7/00
(52) U.S. Cl. .......................... 382/239; 358/426; 341/107
(58) Field of Search ..................... 382/232, 236, 382/242, 243, 239, 233, 248, 251, 253; 341/107, 51, 73, 76; 348/416, 415; 358/426

(56) References Cited

U.S. PATENT DOCUMENTS 5,471,207 * 11/1995 Zandi et al. .......................... 341/107
5,689,589 * 11/1997 Gormish et al. ...................... 382/239

FOREIGN PATENT DOCUMENTS 0448802  10/1991  (EP) ............................... H03M/7/40
0813168  12/1997  (EP) ............................... G06T/9/00

OTHER PUBLICATIONS

Langdon, Jr. et al, "Compression of Black–White Images with Arithmetic Coding", Jun. 1981 (IEEE Transactions on Comm., vol. Com–29, No. 6).

Rissanen et al, "Arithmetic Coding", Mar. 1979 (IBM J. Res. Develop. vol. 23, No. 2).

Gonzales, "DCT Coding for Motion Video Storage Using . . .", Signal Processing, vol. 2, Aug. 1990, pp. 145–154.

Weinberger et al, "Applications of Universal Context . . .", IEEE Transactions, vol. 5, No. 4, Apr. 1, 1996, p. 582.

Tischer et al, "Context–Based Lossless Image Compression", Computer Journal, vol. 36, No. 1, Jan. 1993, pp. 68–77.

* cited by examiner

Primary Examiner—Thomas D. Lee
Assistant Examiner—Wenpeng Chen
(74) Attorney, Agent, or Firm—Jacobson, Price, Holman & Stern, PLLC

(57) ABSTRACT

Image data such as binary mask image data is compressed by partitioning the data into blocks. An arithmetic encoder is initiated for each block and terminated at the end of the block. For each block, there is a fixed template/PDF table pair model which is chosen at the beginning of the block according to motion compensation and other inputs. One model has a template with spatially-correlating samples only, the other having both temporally and spatially-correlating samples. Estimations are made for values of samples which border the current block according to simple rules for the particular template.

12 Claims, 4 Drawing Sheets

FIG. 2

| B1 | B2 | B3 | B4 | B5 | B6 | B7 | B8 | B9 | B10 | B11 |
|----|----|----|----|----|----|----|----|----|-----|-----|
| B12 | B13 | B14 | B15 | | | | | | | |
| B23 | B24 | | | | | | | | | |
| B34 | | | | | | | | | | |
| B45 | | | | | | | | | | |
| B56 | | | | | | | | | | |
| B67 | | | | | | | | | | |
| B78 | | | | | | | | | | |
| B89 | B90 | B91 | B92 | B93 | B94 | B95 | B96 | B97 | B98 | B99 |

FIG. 4
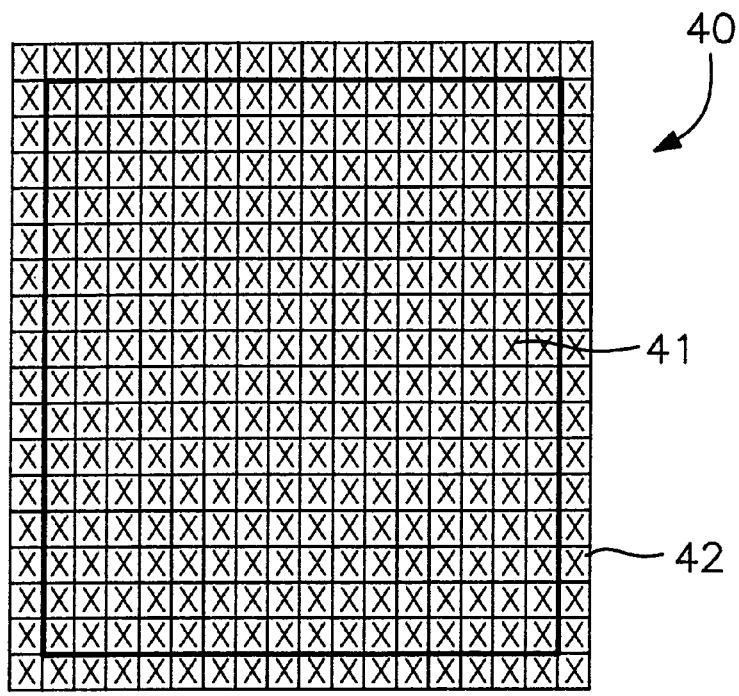
FIG. 5
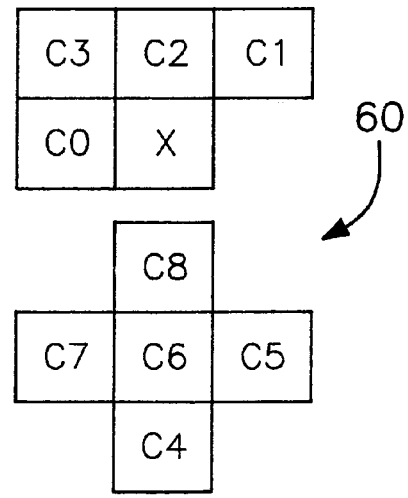
FIG. 6
$$C = \sum_{k=0}^{9} C_k \cdot 2^k$$
$$C = \sum_{k=0}^{8} C_k \cdot 2^k$$

DATA COMPRESSION

FIELD OF THE INVENTION

The invention relates to compression and decompression of binary image data using arithmetic encoding. An example of the image data is a binary mask representing an object shape.

PRIOR ART DISCUSSION

The paper "Arithmetic Coding" by J. Rissanen and G. Langdon in IBM Journal of Research and Development, Vol. 23, No. 2, March 1979 describes compression by arithmetic coding using a statistical model for a data source.

As far as the inventors are aware arithmetic coding has not been applied to moving binary images, and indeed there are problems associated with its use for static binary images.

The paper "Compression of Black-White Images with Arithmetic Coding", IEEE Transactions on Communications, Vol. 29, No. 6, pp. 858–867, June 1981 describes what is now known as context-based arithmetic encoding (CAE) for compression of binary images. The method comprises a modelling part and a coding part. The modelling part comprised two parts. The first part of the model, called the neighbourhood template, defined, for a given binary sample X, those other samples in the image which were considered to have an influence on the value of X. The word "neighbourhood" was used because it is normally a local correlation which exists in binary images. The configuration of the binary samples in this template was represented by an N bit number, where N is the number of pixels in the template. This N bit number was termed the context, denoted C. The second part was the conditional statistical model or conditional probability density function (PDF). This was a function P(X/C) defining the probability of X=0 and X=1 conditional upon C(X) i.e. the context at sample X.

The encoding of a binary image involved firstly an initialisation of the arithmetic encoder. Secondly, each sample of the image was scanned and coded in raster order. The coding of a sample X involved the computation of C(X) based on a predefined template T. The value C(X) was used to access a PDF table containing a representation of P(X/C). The value of X and P(X/C) was used to drive an arithmetic encoder. When the final sample of the image was encoded the arithmetic encoder was terminated. The result was a compressed (arithmetic) code representing the whole binary image.

The decoding of the compressed arithmetic code involved an initialisation of the arithmetic decoder. Samples were then decoded in the same order as used at the encoder. Decoding of sample X required the computation of C(X) and subsequent access to P(X/C). The arithmetic decoder used P(X/C) and the next bits in the arithmetic code to ascertain the value of X. When the last pixel was decoded, the arithmetic decoder was terminated.

Since the compression efficiency is governed by the PDF, it is very important to use one which matches well with the data. Langdon and Rissanen experimented with fixed PDFs and adaptive PDFs. The fixed PDF was generated by analysing a set of typical images (training set) and averaging the statistics over the whole set. For encoding a given image, the PDF was not allowed to change from sample to sample. The problem with this approach was that compression efficiency varied depending on how close the source image was to the average. An image which was atypical of the initial training set would not be compressed efficiently.

To overcome this problem, an adaptive PDF model was employed. The adaptive PDF model used an update algorithm to allow it to keep in touch with the varying local statistics present in many binary images. As each sample value was encoded, the PDF model was changed according to some statistical criterion. At the decoder, the sample update algorithm was used as each sample was decoded. However, this adaptive approach imposes some limitations in terms of error resilience. This is due to the fact that the update algorithm must rely on samples which have already been coded/decoded. If, due to bitstream error, a given sample is decoded incorrectly, then the update algorithm can cause the decoder to desynchronise and the error can propagate unlimited through the remainder of the image resulting in a highly distorted decoded image. Therefore, compression efficiency is achieved through PDF adaptation at the grave expense of error resilience.

OBJECTS OF THE INVENTION

One object of the invention is to provide a method for efficient arithmetic encoding of static and moving binary images.

Another object is to minimise the chances of error propagation, with little effect on compression efficiency.

SUMMARY OF INVENTION

According to the invention, there is provided a method of encoding binary image data comprising the steps of:

receiving the image data;

determining for each sample a PDF table;

computing for each sample a context number according to a template;

selecting for each sample a PDF from the PDF table according to the context number;

an arithmetic encoder encoding each sample in turn according to the PDF and the sample value, characterised in that, the received image data is partitioned into discrete blocks, each block comprising a plurality of samples, the arithmetic encoder is initialised at the start of each block;

the samples of each block are encoded using a fixed template to compute the context number, and a fixed PDF table; and the arithmetic encoder is terminated at the end of each block.

Preferably, the context number is computed by assigning estimated values to samples of the template which are in neighbouring blocks.

In one embodiment, the estimation is performed using rules which are set for each template.

Preferably, the fixed template includes samples from a previous image in an image sequence for exploiting temporal correlations.

In a further embodiment, the template samples from the previous image are determined according to motion compensation.

Preferably, motion compensation is performed by block translation and preferably the block translation includes neighbouring samples.

In one embodiment the fixed template and PDF table are chosen from a set of template/PDF table pair models, at least one model exploiting temporal correlations and at least one other model exploiting spatial correlations only.

In another embodiment, each temporal model exploits both temporal and spatial correlations.

Preferably, the temporal model includes four spatially-correlating samples and five temporally-correlating samples.

In a further embodiment, the spatially-correlating samples include the previous sample in the same row and three samples of the previous row centralised above the sample.

Preferably, the temporally-correlating samples include a sample at a position corresponding to the current sample, and the four vertically and horizontally adjoining samples.

DETAILED DESCRIPTION OF THE INVENTION

BRIEF DESCRIPTION OF THE DRAWINGS

The invention will be more clearly understood from the following description of some embodiments thereof, given by way of example only, with reference to the accompanying drawings, in which:

FIG. 2 is a diagram illustrating the manner in which received image data is partitioned into blocks;

FIG. 3 is a diagram illustrating a particular block;

FIG. 4 is a diagram illustrating a motion compensated block; and

FIGS. 5 and 6 are diagrams illustrating templates used in the method.

DETAILED DESCRIPTION OF THE PREFERRED EMBODIMENT

Figure 1A:
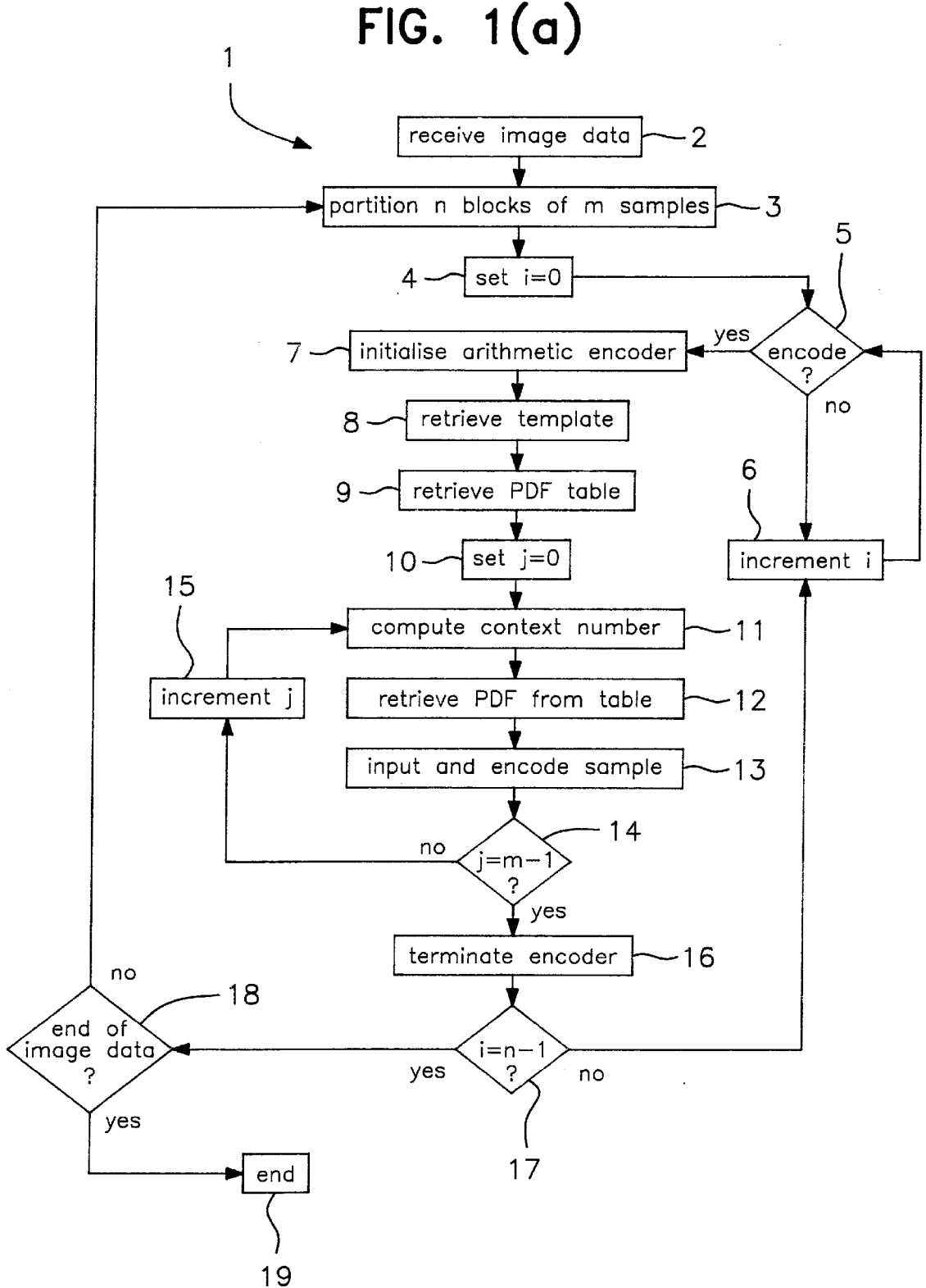
FIGS. 1(a) and 1(b) are flow diagrams illustrating encoding and decoding methods of the invention.

Referring to FIG. 1 an encoding method of the invention is described. The method is indicated generally by the numeral 1.

In step 2, image data is received. In this embodiment, the image data is a binary mask representing an object shape, in which each sample is an individual pixel. Pixels representing the object have a value 1 and other pixels have a value 0. In step 3, the received image data is partitioned into n blocks, each having m samples. FIG. 2 illustrates one screen 29 of received image data, in which there is a first set of blocks B1 to B11, and so n=11. Thus, the processor partitions the received data one row at a time, each row having 11 blocks.

Let i equal the particular block number in a row, this being initially set in step 4 to zero. In decision step 5, a decision is made as to whether or not the block is to be encoded. All of the pixels of the block may be outside the object, or they may be inside the object, or the block may fall on the object border. Encoding only takes place for the latter situation. If encoding is not to take place, then i is incremented in step 6 and the decision step 5 is repeated. When the block which is to be encoded is reached, in step 7 the processor initialises an arithmetic encoder.

In step 8, a template is chosen and retrieved. The choice is signalled to a decoder. In step 9 a PDF table is retrieved. The template/PDF table pair may be referred to as a model. In this embodiment, there are two possible models, namely, an inter model, and an intra model. The inter model has a template which includes samples from a previous image in an image sequence so that it exploits temporal correlations. In addition, the template also includes spatially-correlating samples in the current image.

Referring to FIG. 5, there is illustrated a template 50 for the intra-model, and a template 60 for the inter-model. The template 50 comprises ten spatially-correlating samples C0 to C9 which are spatially related to the current sample X as illustrated in the diagram. The context number C is determined according to the algorithm shown underneath the template 50—the value of each sample contributing one bit of a ten-bit context number.

Referring to FIG. 6, the template 60 comprises two sets of samples. The first set, C0 to C3, are spatially related to the current sample X. The second set, C4 to C8, includes a sample which corresponds to the position of X in an equivalent next-previous image, and also the four adjoining samples in the vertical and horizontal directions. The samples C4 to C8 are determined according to motion compensation by block translation. The context number C is determined according to a similar algorithm, as shown in FIG. 6.

In step 10, the integer j is set to zero, j indicating the current sample or pixel being encoded at any particular time. In step 11, the context number for the pixel is computed according to the relevant algorithm illustrated in FIG. 5 or FIG. 6. In step 12 the relevant PDF is retrieved from the PDF table according to the context number. In step 13, the processor inputs to the arithmetic encoder the actual sample value and the PDF.

Referring to FIG. 3, in this embodiment each block 30 comprises 16×16 pixels and so n=256. FIG. 3 also shows neighbouring pixels. These illustrate an important aspect of the invention whereby during computation of the context number in step 11, estimated values are assigned to samples of the template which are in neighbouring blocks.

These samples from neighbouring blocks are indicated by the numeral 32 in FIG. 3. Those marked with "O" are unknown at decoding time and their values must be estimated during context number computation. These estimations are performed according to simple rules. For example, the following rules are used in the defined sequences for the template 50.

RULE1. if (C7 is unknown) C7=C8
RULE2. if (C3 is unknown) C3=C4
RULE3. if (C2 is unknown) C2=C3.
Similarly, the rule for template 60 is as follows.
RULE1. If (cl is unknown) C1=C2

Referring again to the sample of neighbouring blocks indicated by the numeral 32, those marked with "x" are known at decoding times and thus, their values do not need to be estimated. The exception to this is when packet-based error propagation control is required. In this case, any neighbouring samples which are not part of the current packet are assumed to have a value of zero.

Where the template 60 is used, samples C4 to C8 are from the previous image data. The particular samples are determined according to motion compensation which is performed by block translation. The block translation is performed using neighbouring samples for a block, as illustrated in FIG. 4. In this diagram, the block is indicated by the numeral 41 and the neighbouring samples, the values for all of which are known, by the numeral 42. Motion compensation is used to find a block in the previous image which closely approximates the current block. This is referred to as a motion compensated block, MCB. The location of the MCB is signalled to the decoder by transmission of the relative offset between it and the block to be encoded. This offset is called the motion vector.

As indicated by the steps 13 to 15, encoding takes place for each sample in turn of the current block until all samples have been encoded as determined by the decision step 14.

An important aspect of the invention is the fact that when samples of a particular block have been encoded, the encoder is terminated in step 16. As indicated by the decision step 17, i is incremented to begin encoding the next block and the steps are repeated. When all of the n currently partitioned blocks have been encoded, a decision is made in step 18 as to whether or not there is any further image data. If not, the method ends in step 19. If there is further image data, the next set of n blocks is partitioned in step 3 and the following steps repeated.

Figure 1B:
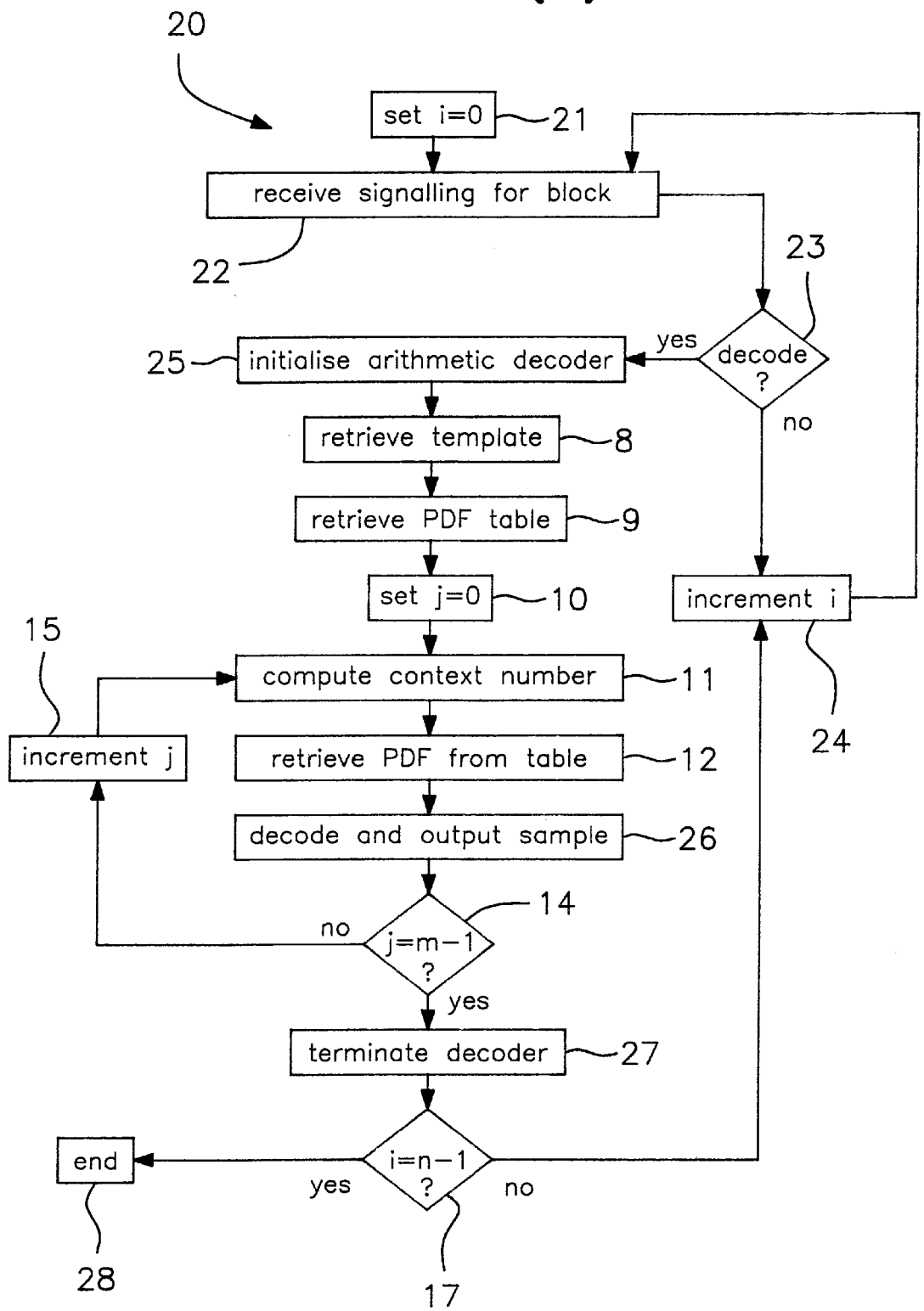

Referring to FIG. 1(b) decoding is now described. The decoder works in a complementary manner to the encoder and like steps are indicated by the same reference numerals. The decoder relies on the aforementioned signalling information to determine if a block is encoded by arithmetic encoding or not. If the decoder ascertains that a block is coded by arithmetic encoding then further signalling information is interpreted to ascertain which model has been used by the arithmetic decoder. These operations are indicated by the steps 22 and 23.

For any block which has been encoded by the arithmetic encoder, the decoder begins by initialising the arithmetic decoder in step 25. At each pixel of the block, a context number is computed using same template and methods as the encoder. The context number is used to access the PDF. The PDF and the next bits of the compressed arithmetic code are used by the arithmetic decoder to decode the pixel value in step 26. The decoder is terminated in step 27 at the end of each block.

It will be appreciated that the invention provides for a highly efficient compression because a model is chosen for each individual block. The available models include one which allows for only spatial correlations, and one which allows for both spatial and temporal correlations. The choice which is made depends on the feedback from the motion compensation steps, the important point being that where there is a relevant block in the previous image, the information from this block can be used in a highly efficient manner. The arithmetic encoder is terminated at the end of each block, thus helping to reduce propagation of errors.

It will also be appreciated that the method is extremely simple as the individual steps are each made using straightforward parameter inputs.

The arithmetic encoder is initialised at the start of every block and terminated at the end of every block, thus allowing the compressed block codes to be multiplexed with other compressed data for the block e.g. coded texture data as in the case of colour images or coded motion and texture data as in the case of colour video.

The method is highly suited to incorporation within packet-based error propagation control mechanisms since it does not use an adaptive model and since it can be chosen to use only pixels from the current packet when computing the context numbers.

The invention is not limited to the embodiments described, but may be varied in construction and detail within the scope of the claims.

What is claimed is:

1. A method of encoding binary image data comprising the steps of:

receiving the image data;

determining for each sample a Probability Density Function (PDF) table;

computing for each sample a context number according to a template;

selecting for each sample a PDF from the PDF table according to the context number;

encoding with an arithmetic encoder each sample in turn according to the PDF and the sample value, wherein, the received image data is partitioned into discrete blocks, each block comprising a plurality of samples, the samples of each block are encoded using a fixed template to compute the context number by assigning an estimated value of the context number calculated from at least one sample in a neighbouring block to at least one sample of the block, and a fixed PDF table.

2. The method of encoding image data as claimed in claim 1, wherein the arithmetic encoder is terminated at the end of each block.

3. The method of encoding image data as claimed in claim 2, wherein the estimation is performed using rules which are set for each template.

4. The method of encoding image data as claimed in claim 1, wherein the fixed template includes samples from a previous image in an image sequence for exploiting temporal correlations.

5. The method of encoding image data as claimed in claim 4, wherein the template samples from the previous image are determined according to motion compensation.

6. The method of encoding image data as claimed in claim 5, wherein motion compensation is performed by block translation.

7. The method of encoding image data as claimed in claim 6, wherein the block translation includes neighbouring samples.

8. The method of encoding image data as claimed in claim 4, wherein the fixed template and PDF table are chosen from a set of template/PDF table pair models, at least one model exploiting temporal correlations and at least one other model exploiting spatial correlations only.

9. The method of encoding image data as claimed in claim 4, wherein each temporal model exploits both temporal and spatial correlations.

10. The method of encoding image data as claimed in claim 9, wherein the temporal model includes four spatially-correlating samples and five temporally-correlating samples.

11. The method of encoding image data as claimed in claim 10, wherein the spatially-correlating samples include the previous sample in the same row and three samples of the previous row centralised above the sample.

12. The method of encoding image data as claimed in claim 10, wherein the temporally-correlating samples include a sample at a position corresponding to the current sample, and the four vertically and horizontally adjoining samples.

* * * * *